United States Patent [19]

Johnson

[11] 4,235,398
[45] Nov. 25, 1980

[54] THERMAL INSULATION FOR AIRCRAFT FUSELAGE

[75] Inventor: William R. Johnson, Seattle, Wash.

[73] Assignee: The Boeing Company, Seattle, Wash.

[21] Appl. No.: 970,773

[22] Filed: Dec. 18, 1978

[51] Int. Cl.³ .................................................. B32B 3/12
[52] U.S. Cl. .................................... 244/119; 428/116;
428/160; 428/593; 428/626
[58] Field of Search .......... 428/116, 73, 593, 117–118,
428/159–160; 244/119, 117 A, 117 R

[56] References Cited

U.S. PATENT DOCUMENTS

| | | | |
|---|---|---|---|
| 2,609,068 | 9/1952 | Pajak | 428/116 X |
| 2,994,110 | 8/1961 | Hardy | 428/425 X |
| 3,000,144 | 9/1961 | Kitson | 52/259 X |
| 3,155,348 | 11/1964 | Ricard | 244/119 |
| 3,160,549 | 12/1964 | Caldwell et al. | 428/40 X |
| 3,740,905 | 6/1973 | Adams | 52/406 X |
| 3,867,244 | 2/1975 | Adams | 428/182 |

Primary Examiner—Henry F. Epstein
Attorney, Agent, or Firm—Lynn H. Hess; B. A. Donahue

[57] ABSTRACT

Thermal insulating apparatus for an aircraft fuselage of the type utilizing a sandwich panel construction. A foam insulation panel is provided which includes a plurality of standoffs for contacting the inwardly-facing skin of the sandwich panel. The standoffs may be arranged in a grid pattern, molded integrally with the rest of the panel, and bonded to the skin of the sandwich panel. The insulation panel may be used with or without a trim panel between it and the fuselage compartment, and in either case a sheet of metal foil may be attached to the inside face of the insulation panel. The foam may be of the self-skinning type so as to resist penetration of moisture into the foam panel and help direct condensate away from the fuselage compartment.

13 Claims, 4 Drawing Figures

U.S. Patent   Nov. 25, 1980   4,235,398
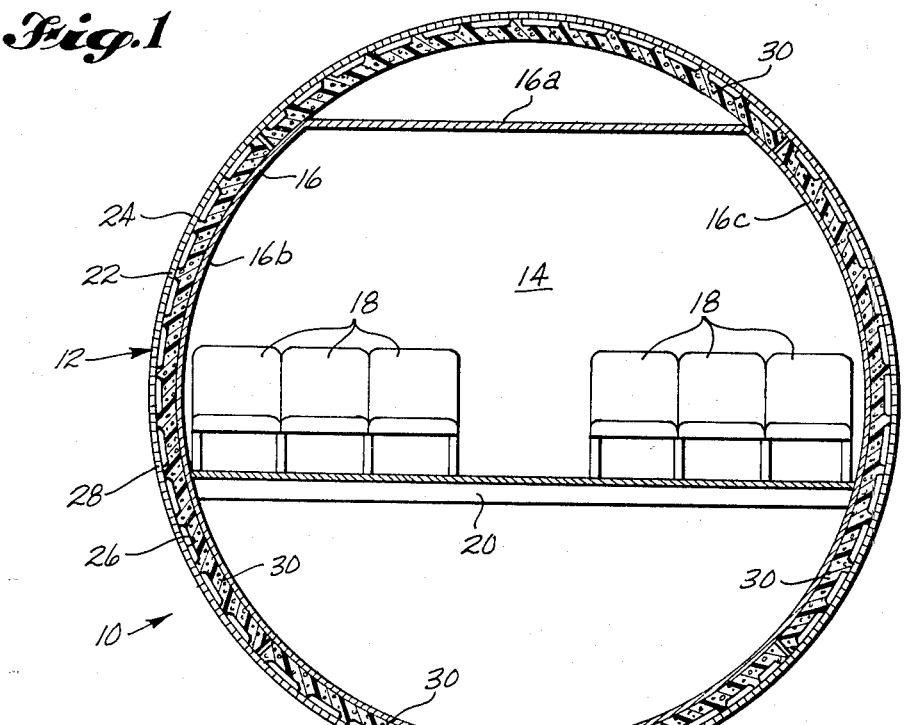
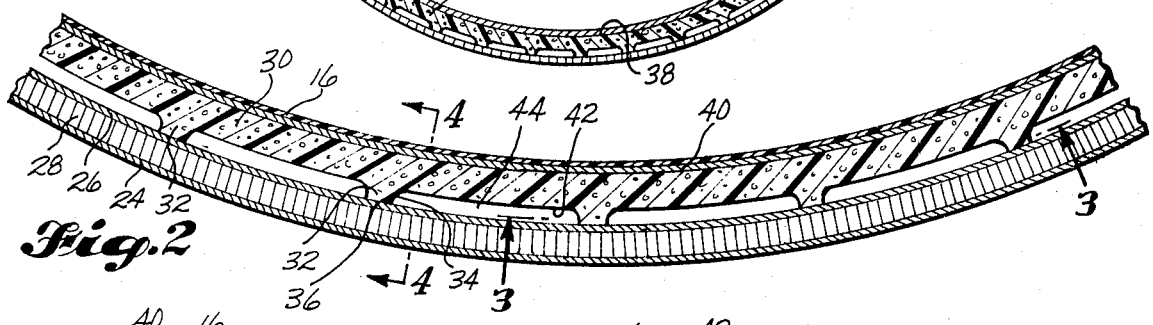
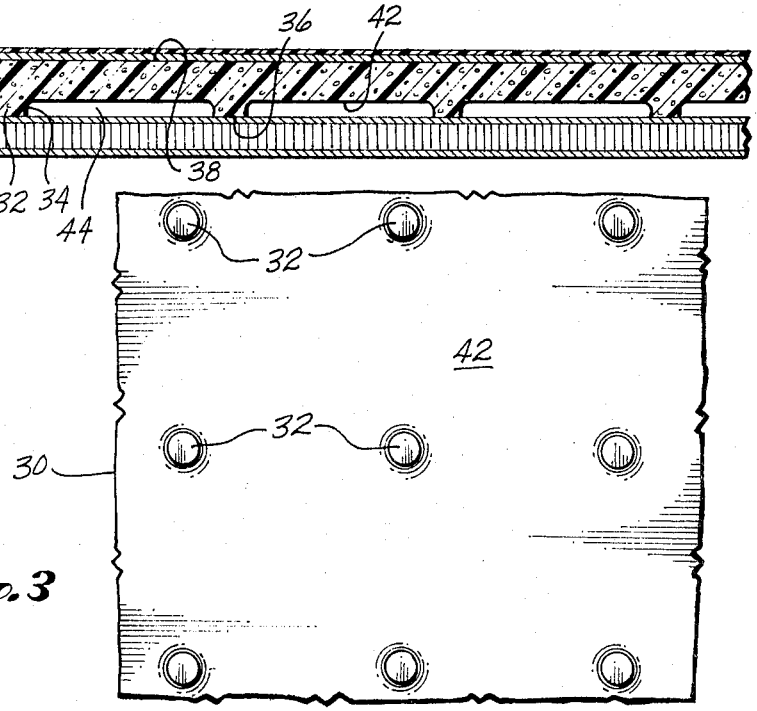

4,235,398

THERMAL INSULATION FOR AIRCRAFT FUSELAGE

BACKGROUND OF THE INVENTION

This invention relates to the thermal insulation of an aircraft fuselage.

The fuselage of an aircraft is enclosed by an outer shell, and in the past this outer shell has generally included a metal outer skin supported around a metal frame consisting of stringer and circumferential members. Since temperatures within the fuselage must usually be controlled in order to insure a proper environment for occupants and cargo, most fuselage shells also include some form of thermal insulation. In many aircraft this insulation takes the form of fiberglass batts supported by the stringer and circumferential members, but a variety of other arrangements have also been employed with varying degrees of success. One such arrangement, for example, is disclosed in U.S. Pat. No. 3,867,244 to Clarence R. Adams.

Whatever type of insulation is utilized as part of the aircraft fuselage it is important that it be protected from condensate which may be present in large quantities. If the insulation is allowed to soak up significant amounts of this condensate the effectiveness of the insulation will be impaired, and thus, for example, where fiberglass batts are used they are generally treated to repel moisture. It is also desirable to prevent moisture from passing through the insulation and dripping or running into the passenger compartment, and so some provision must be made for handling liquid in or adjacent the shell.

Another consideration relative to insulation of the fuselage is that access to both sides of the shell must be provided for inspection purposes. Since virtually the entire outside surface of the shell is exposed, inspection of the outside of the shell presents no problem, but inside surfaces of the fuselage skin are not as accessible. Normally, where insulation batts are utilized as part of the inside of the shell they are readily removable to expose adjacent surface portions of the fuselage skin for inspection.

In some cases a fuselage shell may have an inside wall including substantial portions whose surfaces are not interrupted by structural members or other parts attached thereto. For example, a fuselage shell could be constructed using a sandwich panel comprising inner and outer metal skins on either side of a honeycomb core so that all strengthening members external to the sandwich panel such as stringers and circumferentials are eliminated. With this type of construction batts of insulation generally cannot be used since there are no members for conveniently supporting them, and a new arrangement for efficiently insulating the fuselage while allowing necessary inspection and providing for the presence of condensate is therefore required.

SUMMARY OF THE INVENTION

It is therefore an object of the invention to provide, for the shell of an aircraft fuselage having a wall portion including a continuous and substantially uninterrupted inwardly-facing surface, a thermal insulating structure which is inexpensive and easily installed, which readily permits inspection of wall surfaces facing the interior of the fuselage, and which helps to contain and is not adversely affected by the presence of condensate within and adjacent the fuselage shell.

In accordance with the invention an insulation panel is provided for an aircraft fuselage of the type referred to wherein the insulation panel includes a plurality of standoffs projecting outwardly from the insulation panel for contacting the inwardly-facing surface of the fuselage wall. The insulation panel may be self-supporting; and standoffs may be arranged in a grid pattern, molded integrally with the rest of the insulation panel, and bonded to the inwardly-facing surface. The insulation panel may be used alone or in conjunction with a trim panel, and a sheet of metal foil may be attached to the face of the insulation panel on the side opposite the standoffs. Finally, the insulation panel may be molded from foam, and the foam may be of the self-skinning type so as to resist penetration of moisture into the foam panel and help direct condensate away from the fuselage compartment.

The novel features which are characteristic of the present invention, and other objects and advantages thereof, will be better understood from the following detailed description and the accompanying drawings which together disclose the presently preferred embodiment of the invention.

BRIEF DESCRIPTION OF THE DRAWINGS

FIG. 1 is a cross-sectional view of an aircraft fuselage utilizing the insulation structure of the present invention, FIG. 2 is an exploded view of a portion of the fuselage shell shown in FIG. 1, FIG. 3 is a view taken along line 3—3 in FIG. 2, and FIG. 4 is a view taken along line 4—4 in FIG. 2.

DESCRIPTION OF THE PREFERRED EMBODIMENT

In FIG. 1, an aircraft fuselage 10 is shown in section as including a shell 12 and a fuselage compartment 14. The fuselage compartment 14 is shown in the form of a passenger compartment defined by trim panels 16 including an overhead or ceiling panel 16a, a pair of side panels 16b and 16c, and a floor panel 16d. The floor panel 16d together with a plurality of seats 18 are supported by floor beams 20. The shell 12 has a sandwich panel type construction and includes a sandwich panel 22 comprising an outer skin 24 defining the outer surface of the fuselage, an inner skin 26, and a honeycomb core sheet 28 sandwiched between the outer skin 24 and the inner skin 26.

The shell 12 in accordance with the invention is shown in more detail in FIG. 2 and will be seen to include an insulation panel 30 which may be molded from a foam material such as polyurethane. The insulation panel 30 is self-supporting in that it will not, when left unsupported, collapse from its own weight alone. The size of the individual sheets or segments of insulation panel 30 may be chosen for the particular application and will depend on the size of the fuselage, the size of the fuselage compartment, and a number of other factors. The insulation panels 30 shown in FIG. 1 each extend over approximately 90 degrees of fuselage circumference and could have a length, for example, of three to five feet along the longitudinal axis of the fuselage. The size of panels 30 is not an important part of the invention except as will be hereinafter indicated.

The insulation panel 30, as best seen in FIGS. 2 and 4, includes a plurality of protrusions or standoffs 32 arranged in a grid pattern along the outer face of the panel. The standoffs will preferably be molded as an integral part of the insulation panel, and they may have a circular cross-section as shown in FIG. 4 to facilitate the molding process or any other suitable cross-section. Each standoff will include a side surface portion 34 and an outer surface portion 36. The outer surface portion 36 is adapted for contacting the inner skin 26 of sandwich panel 22, and the surface 36 may include a suitable adhesive for holding the insulation panel in place on the sandwich panel.

The inside face 38 of the insulation panel 30 is on the opposite side of the panel from the standoffs, and a sheet of metal foil 40 such as aluminum foil may be bonded thereto to provide a radiant heat shield. The metal foil 40 will, in addition to improving the effectiveness of the insulation, also help to seal the inner face of the insulation panel.

As seen in FIGS. 1, 2 and 3, inside face 38 adjacent the sides of the fuselage compartment has a contour generally matching that of side trim panels 16b and 16c, and the insulation panel 30 is sandwiched between the sandwich panel 22 and the trim panels along either side of the fuselage compartment. Although the side trim panels 16b and 16c in FIG. 1 and the trim panel 16 in FIGS. 2 and 3 are shown as contacting the inside face 38 of the insulation panel, it may be more practical or even preferable to provide a space between the two so as to permit some air circulation therebetween and also facilitate assembly and installation of the trim panels. The trim panel 16 is primarily a decorative panel made of metal, plastic, or compression molded fiberglass; and the panel 16 will usually be comprised of a plurality of interfitting panels which are individually removable as necessary. These trim panels are not a necessary part of the invention and may be omitted in cargo compartments or other spaces where the appearance of inside walls is not important. For example, in the fuselage shown in FIG. 1 the fuselage shell enclosing the space above the passenger compartment does not include a trim panel.

With the insulation panel 30 in place on sandwich panel 22 the outside face 42 of the insulation panel combines with surfaces 34 to provide a surface which, in cooperation with the inside face of skin 26, defines a chamber 44. The surface made up of surfaces 34 and 42 will preferably be substantially liquid impervious so as to provide a drip shield, and the chamber 44 will therefore serve to contain liquids within the space between sandwich panel 22 and insulation panel 30.

Since the relative humidity within the fuselage will generally be high and temperatures outside the fuselage generally lower than those inside, there will often be considerable amounts of condensate generated within the fuselage in or adjacent the shell. Most of this condensate will appear in the chamber 44 since the temperature within the chamber will be nearly as low as the temperature outside the fuselage. The liquid-impervious surface of insulation panel 30 will therefore act as a shield against moisture which would otherwise penetrate into the insulation and negatively affect its insulating properties. Additionally, the liquid-impervious surface will help to prevent liquid from reaching the trim panel and thereafter leaking through the trim panel into the fuselage compartment.

The individual insulation panels can be arranged so as to minimize the possibility of condensate getting between adjacent insulation panels and thereafter running into the fuselage compartment. For example, in FIG. 1 the insulation panel above ceiling panel 16a extends along enough of the circumference of shell 22 so as to overlap the panel 16a on both sides, and condensate will therefore tend to run downwardly through chamber 44 and around the outside of panel 16a. Similarly, the insulation panels adjacent side panels 16b and 16c extend somewhat below floor panel 16d and will effectively prevent liquid formed as condensate within chamber 44 from getting to the side panels. Some sort of sealing means such as, for example, a liquid resistant tape could be applied to the joints between longitudinally adjacent and/or circumferentially adjacent insulation panels to help prevent liquid from seeping therebetween.

The surfaces 34 and 42 of the insulation panel 30 may be rendered liquid impervious in a number of different ways. If the insulation panel is molded in a self-skinning process, the self-skinning foam can economically provide the liquid-impervious surface which is required. Alternatively, a plastic film or skin such as that manufactured under the Trademark TEDLAR could be used with a non-skinning foam material.

If inspection of the outside surface of skin 26 is necessary such inspection is easily accomplished by breaking out entire segments of panels or by cutting out and removing portions of individual segments as required. Of course any trim panels covering the area to be inspected must first be removed to gain access to the insulation panels. Since foam used for the insulation panels is easily cut and trimmed to shape, individual panels may be easily patched; and since the cost of this form of insulation is relatively low it will be quite feasible to replace entire panels. The replacement panels or portions of panels are simply bonded in place in the same manner as were the panels which they replace. Because of the nature of the standoffs, it is not essential that the standoffs of replacement panels occupy the identical spaces as had been occupied by the panels being replaced. In other words, it is not necessary to maintain a precise grid pattern with the standoffs so long as the insulation panels are firmly supported against the sandwich panel and the inside face of the insulation panel presents a substantially uniform surface.

Therefore, the insulation panel in accordance with the invention will be relatively inexpensive, easily manufactured, and easily installed. No external supports are required for positioning or retaining the insulation panel; and the panel is easily cut or broken out to facilitate inspection of the sandwich panel to which it is attached. The foam insulation panel is easily and inexpensively provided with an integral drip shield, and a metal foil may be bonded to the inside surface of the panel for providing a radiant heat barrier.

It should be understood that, although the insulating structure of my invention has been described specifically in the context of a sandwich panel type of aircraft fuselage, my invention is not limited to use with that particular construction and could be used to advantage whenever the fuselage wall to be insulated includes uninterrupted surfaces which lack means suitable for supporting more conventional insulation. The insulating structure of my invention could also be utilized in combination with more conventional types of insulation. For example, in the fuselage shown in FIG. 1 conventional fiberglass insulation batts could be installed below the floor panel 16d and the insulation panels which are shown as forming part of the fuselage shell below the floor beams 20 could be omitted.

Thus the foregoing description of my invention discloses a preferred embodiment thereof, and various changes in form or detail may be made within the scope of the invention which is defined and limited only by the following claims.

What is claimed is:

1. A shell for an aircraft fuselage, said shell comprising the combination of: a metal outer skin, a metal inner skin, a honeycomb core sandwiched between said inner and outer skins, and a foam insulation panel including a plurality of standoff portions integral therewith and bonded to said inner skin.

2. A shell for an aircraft fuselage as in claim 1 wherein said standoff portions are arranged in a grid pattern.

3. A shell for an aircraft fuselage as in claim 1 wherein said insulation panel is molded from self-skinning foam.

4. A shell for an aircraft fuselage as in claim 1 wherein the fuselage has a fuselage compartment including a ceiling, said foam insulation panel comprising a plurality of segments one of which extends continuously at least across the full width of said ceiling.

5. A shell for an aircraft fuselage as in claim 1 wherein said insulation panel defines a face on the same side of said insulation panel as said standoffs, said face and the sides of said standoffs providing a surface which is impervious to liquids.

6. A shell for an aircraft fuselage as in claim 5 wherein a single space is defined between said surface and said inner skin for collecting liquids.

7. A shell for an aircraft fuselage as in claim 1 including a trim panel, said insulation panel sandwiched between said inner skin and said trim panel.

8. A shell for an aircraft fuselage as in claim 7 wherein said insulation panel defines a continuous face on an opposite side of said insulation panel from said standoff portions, said continuous face contoured to a corresponding adjacent surface of said trim panel.

9. A shell for an aircraft fuselage as in claim 1 including a sheet of metal foil attached to a face of said insulation panel on the opposite side of said insulation panel from said standoff portions.

10. A shell for an aircraft fuselage as in claim 9 wherein said sheet of metal foil is aluminum foil.

11. A shell for an aircraft fuselage as in claim 1 wherein said insulation panel is molded from a self-supporting foam.

12. In an aircraft fuselage having a metal outer skin, a metal inner skin, a honeycomb core sandwiched between said inner and outer skins, and a trim panel; a thermal-insulating structure comprising: an integral self-supporting foam insulation panel sandwiched between said inner skin and said trim panel; said insulation panel including an inner face adjacent said trim panel, an outer face, and a plurality of standoffs arranged in a grid pattern along said outer face; said standoffs each including an outer surface portion bonded to said inner skin; said insulation panel molded from a self-skinning foam and providing a liquid-impervious surface along said outer face; said liquid-impervious surface and said inner skin defining a single chamber there-between for containing liquid condensate.

13. In an aircraft fuselage as in claim 12 including an aluminum foil sheet attached to said inner face of said insulation panel.